United States Patent
Kawaragi

(10) Patent No.: US 9,332,150 B2
(45) Date of Patent: May 3, 2016

(54) TEXT SCANNING SYSTEM, IMAGE PROCESSING APPARATUS, AND TEXT SCANNING METHOD

(71) Applicants: KABUSHIKI KAISHA TOSHIBA, Tokyo (JP); TOSHIBA TEC KABUSHIKI KAISHA, Tokyo (JP)

(72) Inventor: Akira Kawaragi, Ito Shizuoka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 14/468,137

(22) Filed: Aug. 25, 2014

(65) Prior Publication Data

US 2016/0057309 A1 Feb. 25, 2016

(51) Int. Cl.
 *H04N 1/04* (2006.01)
 *H04N 1/00* (2006.01)

(52) U.S. Cl.
 CPC ............. *H04N 1/04* (2013.01); *H04N 1/00129* (2013.01)

(58) Field of Classification Search
 CPC .......... H04N 2201/3269; H04N 1/00244; H04N 2201/0094; H04N 2201/0081; G06F 17/30879; G06F 3/1208; G06F 9/44526; G06F 21/608; G06F 3/1256; G06F 3/1285; G06F 17/246; G06F 17/289; G06F 17/3028
 USPC ............ 358/1.15, 1.11, 3.28, 474, 1.14, 1.18, 358/1.13, 1.16, 1.9, 3.24, 402, 448; 382/166, 190, 100, 101, 141, 195, 238; 709/203, 206, 217, 219, 223
 See application file for complete search history.

(56) References Cited

U.S. PATENT DOCUMENTS

| | | | |
|---|---|---|---|
| 6,903,838 B1* | 6/2005 | Hanson | H04N 1/32765 358/1.15 |
| 7,136,932 B1* | 11/2006 | Schneider | 709/245 |
| 8,169,423 B2* | 5/2012 | Takeuchi | G06F 3/0317 178/19.05 |
| 8,627,075 B2* | 1/2014 | Ikeda | H04B 5/02 455/41.1 |
| 8,675,978 B2* | 3/2014 | Sato | G06T 9/004 382/232 |
| 2002/0079371 A1* | 6/2002 | Bobrow | G06F 3/03546 235/454 |
| 2004/0150855 A1* | 8/2004 | Tonegawa | 358/1.15 |
| 2005/0063004 A1* | 3/2005 | Silverbrook | G06F 3/014 358/1.15 |
| 2005/0111053 A1* | 5/2005 | Yoshida et al. | 358/448 |
| 2006/0274390 A1* | 12/2006 | Otake | 358/537 |
| 2007/0238505 A1* | 10/2007 | Okada | 463/16 |
| 2011/0312278 A1* | 12/2011 | Matsushita | H04L 12/40013 455/66.1 |
| 2012/0038941 A1* | 2/2012 | Megawa | 358/1.13 |
| 2012/0274970 A1* | 11/2012 | Cok | 358/1.14 |
| 2012/0307277 A1* | 12/2012 | Kishida | 358/1.13 |
| 2013/0227098 A1* | 8/2013 | Nebayashi | 709/222 |

FOREIGN PATENT DOCUMENTS

| | | |
|---|---|---|
| JP | 2008-061117 | 3/2008 |
| JP | 2013-074588 | 4/2013 |

* cited by examiner

*Primary Examiner* — Negussie Worku
(74) *Attorney, Agent, or Firm* — Patterson & Sheridan, LLP

(57) ABSTRACT

A text scanning system includes a processor configured to extract character information from image data of an image, generate a two-dimensional code representing the extracted character information, and output the two-dimensional code, and a display unit configured to receive and display the two-dimensional code.

11 Claims, 5 Drawing Sheets

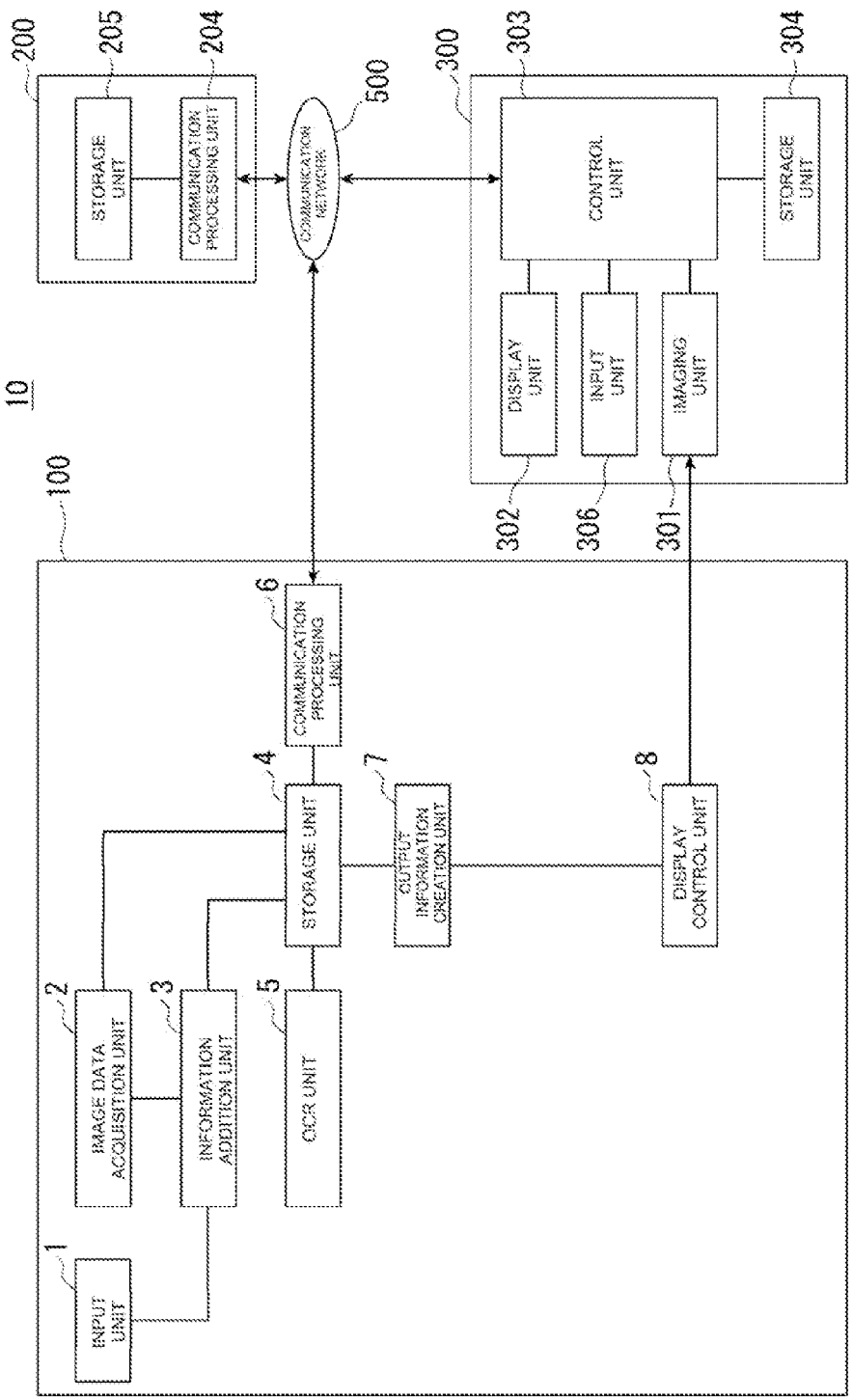

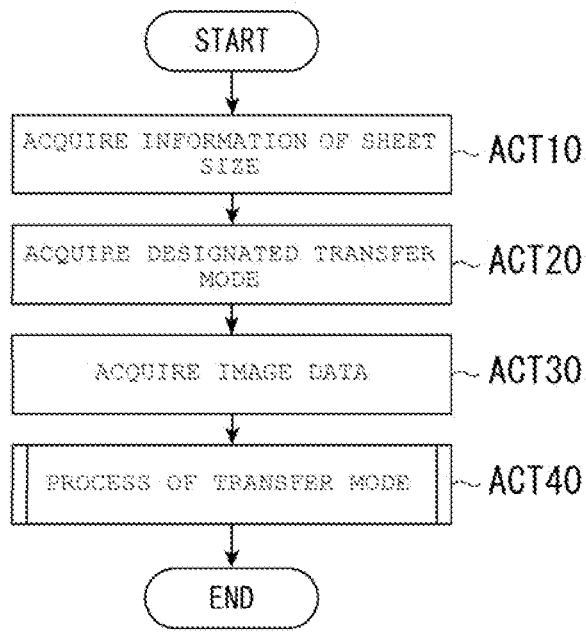
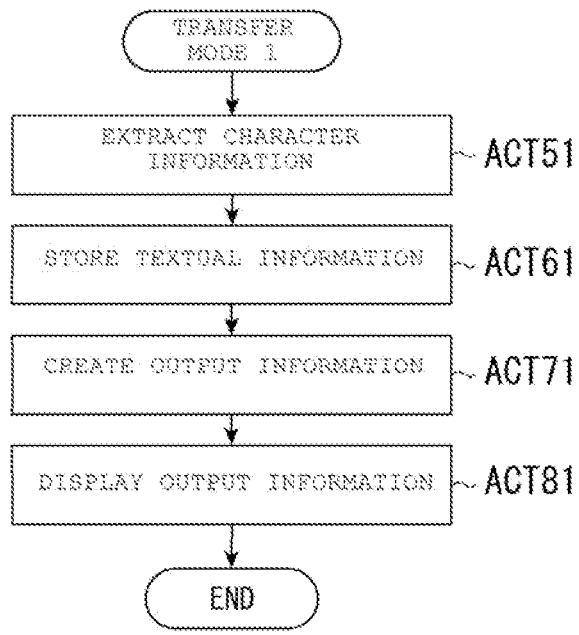

FIG. 7

| No. | Name | Telephone | Address | e-mail |
|---|---|---|---|---|
| 1 | ALICE | Telephone1 | Address1 | alice@docodemo.net.jp |
| 2 | BOB | Telephone2 | Address2 | bob@goodmail.con |
| 3 | | | | |
| | | | | |

FIG. 8

| No. | Name | Telephone | Address | e-mail |
|---|---|---|---|---|
| 1 | ALICE | Telephone1 | Address1 | alice@docodemo.net.jp |
| 2 | BOB | Telephone2 | Address2 | bob@goodmail.con |
| 3 | | | | |

FIG. 9

| No. | Name | Telephone | Address | e-mail |
|---|---|---|---|---|
| 1 | ALICE | Telephone1 | Address1 | alice@docodemo.net.jp |
| 2 | BOB | Telephone2 | Address2 | bob@goodmail.con |
| 3 | | | | |
| | | | | |

TEXT SCANNING SYSTEM, IMAGE PROCESSING APPARATUS, AND TEXT SCANNING METHOD

FIELD

Embodiments described herein relate generally to a text scanning system, an image processing apparatus, and a text, scanning method.

BACKGROUND

A technology is known in which a sheet surface having text recorded thereon is imaged using a portable terminal device provided with an imaging unit, such as a built-in camera, and the imaged text is captured. According to this technology, first, the imaging unit of the terminal device captures the text recorded on the sheet as image information. Next, a signal processing unit of the terminal device extracts the text included in the image information.

However, imaging by using the terminal device as described above causes a quality of the image information to be unstable. In this regard, the problem of the unstable quality which is caused by using the terminal device is not generated when a Multifunction Peripheral (MFP) (an image processing apparatus) is used. A general MFP includes an image reading unit for scanning a sheet. The MFP is able to maintain and acquire a quality of image information by scanning the sheet with the image reading unit. When the sheet surface is imaged by using the terminal device, it is hard to secure accuracy of text imported by the terminal device.

DESCRIPTION OF THE DRAWINGS

FIG. 2 is a diagram illustrating functional blocks of an image processing apparatus.

FIG. 3 is a flowchart illustrating example operations in which the image processing apparatus scans text recorded on a sheet.

FIG. 4 is a flowchart illustrating example operations of a "first transfer mode".

FIG. 7 illustrates an example of text recorded in a tabular form.

FIG. 8 illustrates an example of an output type of character information extracted from an address book.

FIG. 9 illustrates an example modification of the third transfer mode.

DETAILED DESCRIPTION

Figure 1:
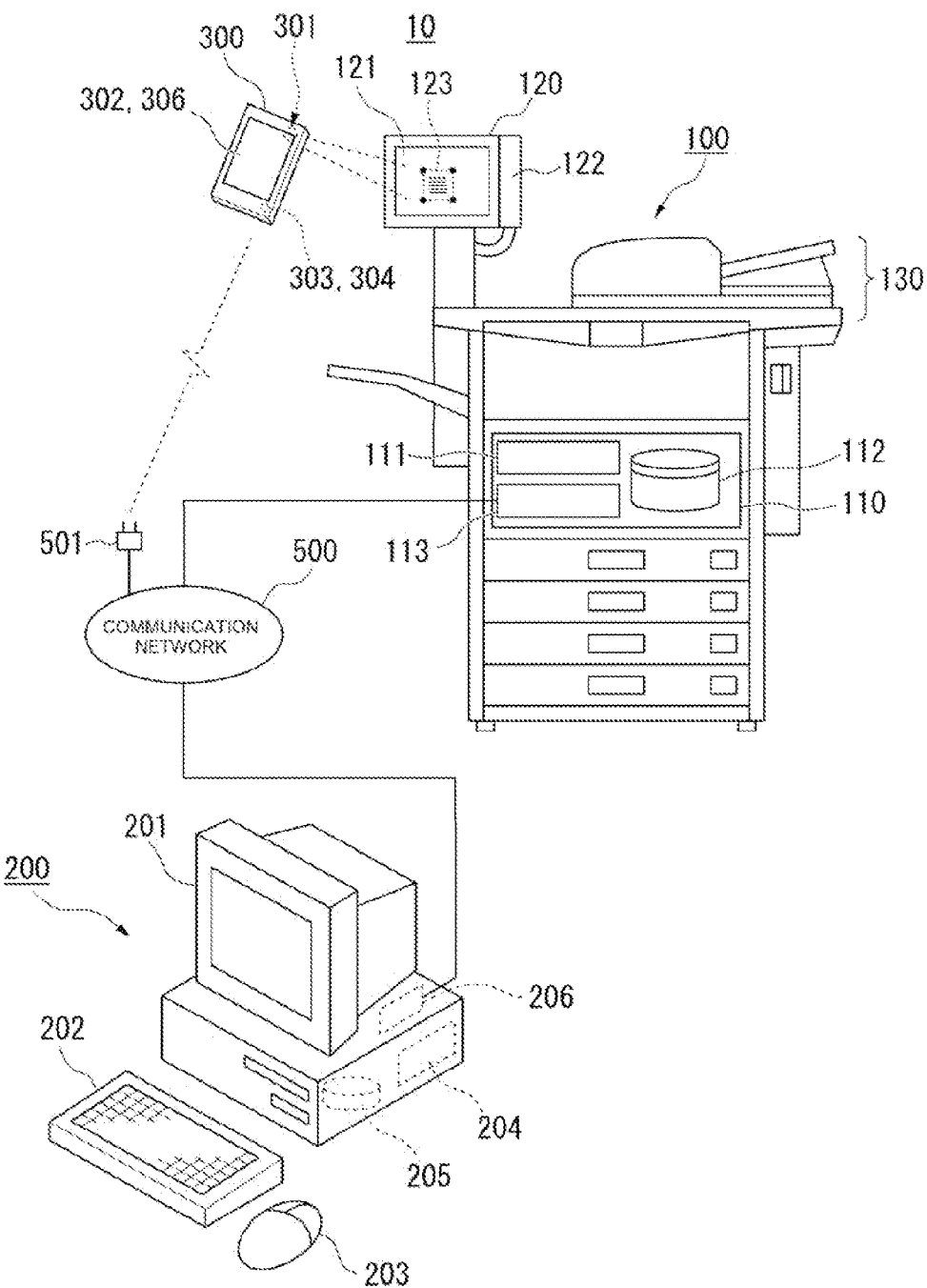
FIG. 1 is a configuration diagram illustrating a text scanning system according to an embodiment.

A text scanning system includes a processor configured to extract character information from image data of an image, generate a two-dimensional code representing the extracted character information, and output the two-dimensional code, and a display unit configured to receive and display the two-dimensional code.

Hereinafter, the text, scanning system according to the embodiment will be described with reference to the drawings. Furthermore, the same reference numerals will be applied to the same configurations of each of the drawings.

FIG. 1 is a diagram illustrating a configuration of a text scanning system according to an embodiment. A text scanning system 10 illustrated in FIG. 1 includes an image processing apparatus 100, a server device 200, and a terminal device 300. The image processing apparatus 100, the server device 200, and the terminal device 300 are connected through a communication network 500 to be able to communicate with each other. Furthermore, at least a portion of the communication described above may be wireless communication. For example, the terminal device 300 may be configured to be connected with the communication network 500 through a communication device 501 which is a wireless base station.

The image processing apparatus 100 may be a Multi-Function Peripheral (MFP). For example, the image processing apparatus 100 is provided with functions such as a copy function, a printer function, a scanner function, a FAX function, or an e-mail transmission and reception function. The image processing apparatus 100 integrally controls hardware instruments in the same apparatus. The image processing apparatus 100 includes a control board 110 for causing each unit described from FIG. 2 to function. The control board 110 includes a processor 111 and a memory 112. The processor 111 may be an arithmetic processor. The memory 112 includes a Random Access Memory (RAM) as a volatile storage device, a Read Only Memory (ROM) as a non-volatile storage device, or a Hard Disk Drive (HDD), for example. In addition, the control board 110 includes a Network Interface Card (NIC) 113. The NIC 113 controls external communication.

The image processing apparatus 100 includes a control panel 120. The control panel 120 includes a keyboard 122 and a touch panel display 121. The keyboard 122 receives an instruction from a user. The touch panel display 121 receives an instruction from the user along with displaying control content.

In addition, the image processing apparatus 100 includes an image reading unit 130 which is, for example, a scanner. The image reading unit 130 scans and reads out images of, for example, a sheet or a book.

A hardware configuration of the server device 200 has, for example, the same configuration as that of a current personal computer or a current server device. For example, the server device 200 includes a communication processing unit 204, a storage unit. 205, and a NIC 206. The NIC 113 controls communication with the NIC 206. The NIC 113 communicates with the NIC 206 through the communication network 500. In addition, the server device 200 includes a keyboard 202, a mouse 203, and a monitor 201. The keyboard 202 receives input from the user. The monitor 201 displays an image to the user.

Next, functional blocks of the image processing apparatus 100 will be described with reference to FIG. 2. FIG. 2 illustrates functional blocks of the image processing apparatus 100. The image processing apparatus 100 includes an input unit 1, an image data acquisition unit 2, an information addition unit. 3, a storage unit 4, an OCR unit 5, a communication processing unit 6, an output unit 7, and a display control unit 8.

For example, the respective units of the image processing apparatus 100 are achieved by a configuration (here, referred to as "configuration A") including the processor 111 and the memory 112 illustrated in FIG. 2. The processor 111 executes a program which is stored in the memory 112 in advance, and performs the functions of the respective units described above. In addition, the input unit 1 may further be achieved by a configuration including the control panel 120, in addition to the configuration A described above. In this case, it is possible for the user to configure the image processing apparatus 100 to be manipulated by using the control panel 120 which is positioned above the image processing apparatus 100. In addition, the input unit 1 may be achieved by a configuration including the NIC 113, in addition to the configuration A described above. In this case, it is possible for the user to configure the image processing apparatus 100 to be manipulated by using the terminal device 300.

In addition, the image data acquisition unit 2 may further be achieved by a configuration including the image reading unit 130, in addition to the configuration A. In this case, it is possible for the user to configure the image processing apparatus 100 to acquire image data by scanning the manuscript with the image reading unit 130.

The server device 200 includes the communication processing unit 201 and the storage unit 205.

The communication processing unit 204 stores text information transmitted from the image processing apparatus 100 in the storage unit 205, according to an instruction from the image processing apparatus 100. The communication processing unit 204 stores the text information, and then transmits information of a storage region of the storage unit 205 in which the text information is stored to the image processing apparatus 100. In addition, according to a request from the terminal device 300, the communication processing unit 204 transmits the text information according to the request to the terminal device 300.

The terminal device 300 includes an imaging unit 301, a display unit 302, a control unit 303, a storage unit 304, and an input unit 306. The imaging unit 301 performs imaging with respect to a provided optical system in an optical axis direction, and creates image data. The control unit 303 stores the image data created by the imaging unit 301 in the storage unit 304, according to a process performed by a desired program. In addition, when an image of a two-dimensional code is included in the image data, the control unit 303 creates text information indicated by the two-dimensional code. The control unit 303 stores the created textual information in the storage unit 304. The control unit 303 displays the created character information on the display unit 302, according to an instruction of the user input from the input unit 306.

FIG. 3 is a flowchart illustrating example operations in which the image processing apparatus 100 scans text recorded on a sheet. The image data acquisition unit 2 performs the following processes after receiving a request for scanning, for example, the request for scanning includes a request for scanning from the terminal device 300, a request for scanning by using the image reading unit 130, or the like.

The image data acquisition unit 2 acquires information of a sheet size to be scanned through the input unit 1 (ACT 10).

Next, the image data acquisition unit 2 acquires information for designating a "transfer mode" through the input unit 1 (ACT 20). Furthermore, the "transfer mode" indicates a method of handling the textual information as a scan result. The user is able to determine a transfer method by designating the transfer mode. For example, the input unit 1 displays one or more selectable transfer modes on the display unit of the terminal device 300 or the control panel 120. Here, the user designates a transfer mode among the displayed transfer modes. The input unit 1 acquires the information of the transfer mode designated by the user, and stores the acquired information of the transfer mode in the storage unit 4.

Next, the image data acquisition unit 2 acquires the image data (ACT 30). The image data acquisition unit 2 collectively stores the information related to the acquired image data in the storage unit 4 as one image acquisition file. For example, the information related to the acquired image data includes various setting values such as acquired image data, the number of acquired image data items, and the size of a sheet (a sheet size) on which the acquired image data is provided.

Next, the OCR unit 5 (the extraction unit) and the output information creation unit 7 perform processes according to the selected transfer mode, with reference to the storage unit 4 (ACT 40). Hereinafter, processes of each of a first transfer mode to a third transfer mode will be described in sequence.

Case of First Transfer Mode

First, with reference to FIG. 4, the process of the transfer mode which is set as a "first transfer mode" will be described. FIG. 4 is a flowchart illustrating example operations of the "first transfer mode". For example, when the "first transfer mode" is set, the OCR unit 5 and the output information creation unit 7 perform the operations of the first transfer mode.

In this case, the OCR unit 5 refers to the image data of the image acquisition file stored in the storage unit 4 after the acquired image data is processed through the image processing. The OCR unit 5 extracts character information included in the image data from the same image data of the image acquisition file (ACT 51).

The OCR unit 5 stores the extracted character information in the storage unit 4 (ACT 61).

The output information creation unit 7 creates a two-dimensional code (which represents the character information) as output information, on the basis of the extracted character information (ACT 71). The output unit 7 displays the created two-dimensional code on the control panel 120 (ACT 81).

The terminal device 300 reads out the two-dimensional bar coda displayed on the control panel 120. Thus, the terminal device 300 acquires the character information represented by the read two-dimensional bar code. Accordingly, the terminal device 300 acquires the character information recorded on the sheet by the first transfer mode.

Case of Second Transfer Mode

Figure 5:
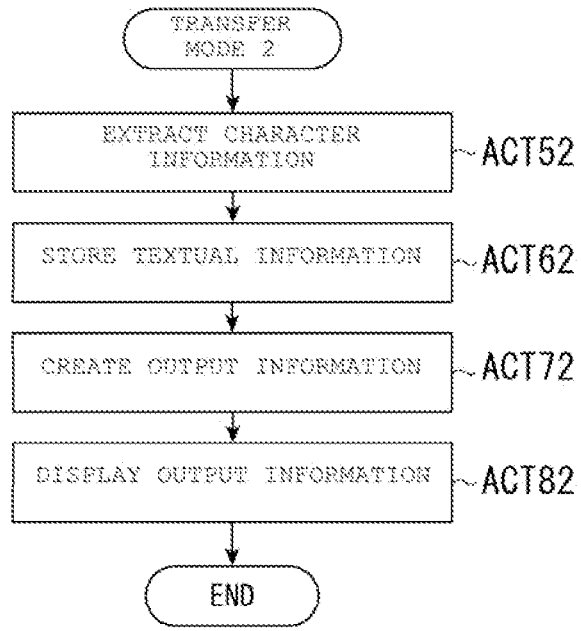
FIG. 5 is a flowchart illustrating example operations of a "second transfer mode".

Next, with reference to FIG. 5, the process of the transfer mode which is set as a "second transfer mode" will be described. FIG. 5 is a flowchart illustrating example operations of the "second transfer mode". For example, when the "second transfer mode" is set, the OCR unit 5 and the output information creation unit 7 perform the operations of the second transfer mode.

In this case, the OCR unit 5 refers to the image data of the image acquisition file stored in the storage unit 4 after the acquired image data is processed through the image processing. The OCR unit 5 extracts character information included in the image data from the same image data of the image acquisition file (ACT 52).

The OCR unit 5 stores the extracted character information in the storage unit 4. In addition, the communication processing unit 6 stores the character information stored in the storage unit 4 in the storage unit of the server device 20G through the NIC 113. The communication processing unit 6 acquires information related to the server device 200 in which the character information is stored from the server device 200. For example, the information related to the server device 200 includes information for identifying the server device 200 in which the character information is stored, and information indicating the storage region of the server device 200. In addition, for example, the information related to the server device 200 may be a Uniform Resource Locator (URL) indicating the storage region (ACT 62).

The output information creation unit 7 creates the two-dimensional code showing the information related to the server device 200 as the output information (ACT 12). For example, the output information which is the two-dimensional code includes the information for identifying the server device 200, and the information indicating the storage region of the server device 200. The output information creation unit 7 displays the created two-dimensional code on the control panel 120 (ACT 82).

Here, the terminal device 300 reads out the two-dimensional bar code displayed on the control panel 120. Thus, the terminal device 300 obtains information indicated by the two-dimensional code displayed on the control panel 120. The two-dimensional code includes the information for identifying the server device 200, and the information specifying the storage region of the server device 200. Therefore, the terminal device 300 acquires information for specifying the storage region in which the character information is stored by reading out the two-dimensional code. The terminal device 300 is able to acquire desired character information from the server device 200, based on the information for specifying the storage region in which the character information is stored. Accordingly, the terminal device 300 is able to acquire the character information recorded on the sheet by a method of a transfer mode 2.

Case of Third Transfer Mode

Figure 6:
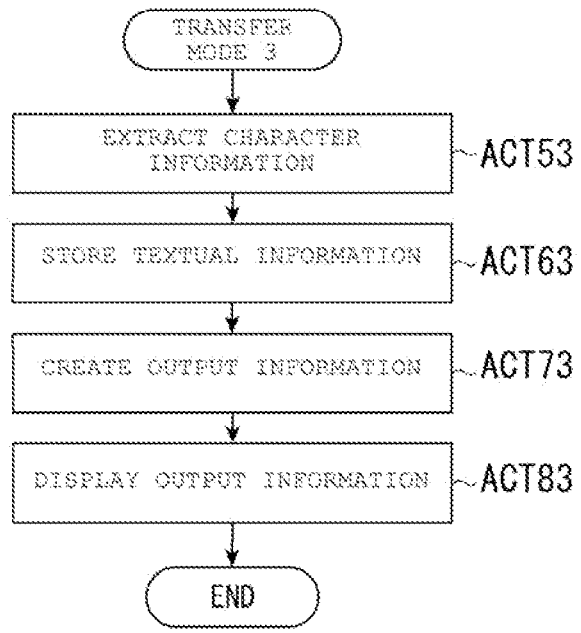
FIG. 6 is a flowchart illustrating example operations of a "third transfer mode".

Next, with reference to FIG. 6, the process of the transfer mode which is set as a "third transfer mode" will be described. FIG. 6 is a flowchart illustrating example operations of the "third transfer mode". For example, when the "third transfer mode" is set, the OCR unit 5 and the output information creation unit 7 perform the operations of the third transfer mode.

The third transfer mode is directed to a case where the text recorded on the sheet is in a tabular form. The image processing apparatus 100 in which the third transfer mode is set, extracts character information which is recorded in the tabular form from the taken image.

FIG. 7 is an example of text recorded in a tabular form. For example, an example of text recorded in tabular form includes information recorded in an address book. In the address book, names as well as information items such as phone numbers, addresses, or e-mail addresses corresponding to the names are often recorded in tabular form.

In the table illustrated in FIG. 7, headings of "No.", "Name", "Telephone", "Address", and "e-mail" are provided. Under the heading of "No.", identification numbers for identifying registration information are provided. Under the heading of "Name", names of people registered in the address book are provided. Under the heading of "Telephone", phone numbers of the people registered in the address book are provided. Under the heading of "Address", addresses of the people registered in the address book are provided. Under the heading of "e-mail", e-mail addresses of the people registered in the address book are provided.

Here, information item of two people "ALICE" and "BOB" is illustrated, but the number of people in the table, the number of characters in the respective headings, recording types of the respective headings, or the like may be suitably determined. Furthermore, the information recorded in the address book may include at least any one of the phone number, the address, and the e-mail address. In addition, when it is not possible to record the information on one sheet, the information may be divided into a plurality of sheets. In this case, the information which is divided into a plurality of sheets after being acquired recorded as one table.

Furthermore, in the image taken by imaging a sheet surface of such an address book, the character information of the address book recorded in the tabular form is included.

Here, the OCR unit 5 separates and acquires information of ruled lines of the table as well as character information of the table. In general, the ruled lines are configured by combining a plurality of orthogonal straight lines. For example, it is possible to separate and acquire the information of the ruled lines of the table and the character information of the table by using a feature of the ruled lines described above as a determination condition.

Here, with reference to FIG. 8, an output type of the extracted character information from the address book will be illustrated. FIG. 8 illustrates an example of an output type of extracted character information from an address book. In the output type illustrated in FIG. 8, only the characters illustrated in FIG. 7 described above are displayed. Thus, even if only the character information is extracted and displayed by omitting the ruled lines, it is possible to display necessary information as the information of the address book. At this time, it is possible to display the extracted character information in order to be simply understood so that the extracted character information is information corresponding to each of the headings by displaying the extracted character information in each position corresponding to each of the sections.

Meanwhile, in a general two-dimensional code, character information is able to be encoded and displayed. According to the output type illustrated in FIG. 8 described above, the information necessary for displaying is limited to the character information. Therefore, it is possible to display the information illustrated in FIG. 8 by using the two-dimensional code which encodes the character information.

Returning to FIG. 3, example operations according to the third transfer mode will be described.

The OCR unit 5 refers to the image data of the image acquisition file stored in the storage unit 4 after the acquired image data is processed through the image processing. The OCR unit 5 extracts the character information included in the image data and recorded in the tabular form from the same image data in the image acquisition file (ACT 53).

The OCR unit 5 stores the extracted character information in the storage unit A (ACT 63).

The output information creation unit 7 creates the two-dimensional code representing the character information as the output information, on the basis of the extracted character information (ACT 73). The output unit 7 displays the created two-dimensional code on the control panel 120 (ACT 33).

Here, the terminal device 300 reads out the two-dimensional code displayed on the control panel 120. Thus, the terminal device 300 is able to acquire the character information recorded as a table which is the character information represented by the two-dimensional bar code. Accordingly, the terminal device 300 is able to acquire the character information recorded in the tabular form by the same method as that of the transfer mode 1.

According to the text scanning system 10 according to the embodiment described above, it is possible to refer to the text recorded on the sheet from the terminal device 300 or the like.

Modification Example of Third Transfer Mode

With reference to FIG. 9, an output modification of the third transfer mode will be described. FIG. 9 illustrates an example modification of the third transfer mode. FIG. 3 described above illustrates an example which does not display the ruled lines, and only extracts the character information of the table illustrated in FIG. 7. On the other hand, in the example illustrated in FIG. 9, the ruled lines are displayed in addition to the character information of the table. Furthermore, in the ruled lines illustrated herein, horizontal lines are configured by using a plurality of "—" (dashes), and vertical lines are configured by using a plurality of "|" (vertical bars).

Even if such ruled lines are similarly displayed, identification as the table is possible. According to such a display type, the entire display including the ruled lines is able to be indicated only by the character information. Therefore, this mode is also able to show the information illustrated in FIG. 9 as described above, by using the two-dimensional code which encodes the character information.

In this modified example, the following operations are performed in ACT 53. The OCR unit 5 refers to the image data of the image acquisition file stored in the storage unit 1 after the acquired image data is processed through the image processing. The OCR unit 5 extracts character information which is included in the image data and recorded in the tabular form. The OCR unit 5 also extracts information regarding types and positions of the ruled lines from the same image data of the image acquisition file. At this time, the OCR unit 5 adds information for emulating the ruled lines to the character information, on the basis of the extracted information of the types and the positions of the ruled lines. For example, a character which is added as the information for emulating the ruled lines is a character such as "—" (dash) illustrating the horizontal lines or a character such as "|" (vertical bar) illustrating the vertical lines. Such characters for emulating the ruled lines may be added to the positions illustrating the ruled lines. According to such a process, the character information to which the horizontal lines and the vertical lines for emulating the ruled lines are added is formed. Furthermore, any one of the horizontal lines and the vertical lines for emulating the ruled lines may be extracted and displayed.

The process procedure after ACT 63 is the same as the process procedure of the third transfer mode described above. However, the information to be created in ACT 73, and the information to be displayed by the two-dimensional bar code in the ACT 83 is information illustrated in FIG. 9.

In the text scanning system 10 of the modified example according to the embodiment described above, it is also possible to refer to the text recorded on the sheet from the terminal device 300 or the like.

In this embodiment, a case where the two-dimensional code is used for exchanging the information between the apparatuses is illustrated, but the textual information or the URL may be allocated to two-dimensional geometric information. In this case, the two-dimensional geometric information may be used for exchanging the information between the apparatuses instead of the two-dimensional code.

In addition, a case where the terminal device 300 is a portable device is illustrated, but a main body portion may be configured as a stationary type. In addition, the imaging unit and the control unit of the terminal device 300 may be configured to be separated. In addition, the terminal device 300 may read out the two-dimensional code by using the portable imaging unit.

In addition, a case where the output unit 7 of the image processing apparatus 100 displays the created two-dimensional code on the control panel 120 is illustrated, but the embodiment is not limited thereto. For example, the output unit 7 may display the information on the display unit of another device. For example, the other device may be the server device 200, and the information may be displayed on the monitor 201 which is the display unit.

According to at least one embodiment described above, the text scanning system 10 outputs the information related to the character information as the two-dimensional geometric information, by including the OCR unit 5 and the output unit 7. In such a text scanning system 10, the OCR unit 5 extracts the character information from the taken image. The output unit 7 outputs the desired information so that the extracted character information is allowed to be imported by an apparatus other than the subject apparatus (the image processing apparatus 100). The output unit 7 is able to set the information related to the extracted character information as the two-dimensional geometric information, and to output the desired information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and chances in the form of the embodiments described herein may be made without departing from the spirit of the inventions. The accompanying claims and their equivalents are intended to cover such forms or modifications as would fall within the scope and spirit of the inventions.

What is claimed is:

1. A text scanning system comprising:
an input unit configured to receive an instruction indicating one of a first mode and a second mode;
a scanner configured to generate an image data;
a processor configured to
extract character information from the image data,
generate a first two-dimensional code representing the extracted character information if the received instruction indicates the first mode, and
store the extracted character information in a storage unit and generate a second two-dimensional code indicating a location of extracted character information stored in the storage unit if the received instruction indicates the second mode; and
a display unit configured to display one of the first two-dimensional code and the second two-dimensional code.

2. The system according to claim 1, wherein:
the storage unit is configured to communicate with a terminal device, and
the processor is further configured to output one of the two-dimensional code and the second two-dimensional code to the terminal device.

3. The system according to claim 1, wherein the processor is configured to extract the character information in tabular form from the image data.

4. The system according to claim 3, wherein the processor is configured to:
extract the character information, a ruled line and a position of the ruled line from the image data,
convert the extracted ruled line to a character emulating the extracted ruled line,
generate a character information based on the extracted character information, the character converted from the extracted ruled line and the position of the ruled line, and
generate one of the first two-dimensional code and the second two-dimensional code based on the generated character information.

5. A text scanning method comprising the steps of:
receiving an instruction indicating one of a first mode and a second mode by an input unit;
generating an image data by a scanner;
extracting character information from the image data;
generating a first two-dimensional code representing the extracted character information if the received instruction indicates the first mode;
storing the extracted character information in a storage unit and generating a second two-dimensional code indicating a location of extracted character information stored in the storage unit if the received instruction indicates the second mode; and, displaying one of the first two-dimensional code and the second two-dimensional code.

6. The method according to claim 5, wherein:

the storage unit is configured to communicate with a terminal device, and one of the first two-dimensional code and the second two-dimensional code is output to the terminal device.

7. The method according to claim 5, wherein the character information is extracted in tabular form from the image data.

8. The method according to claim 7, further comprising:

extracting, from the image data, a ruled line and a position of the ruled line relative to the character information;

converting the extracted ruled line to a character emulating the extracted ruled line;

generating a character information based on the extracted character information, the character converted from the extracted ruled line and the position of the ruled line; and generating one of the first two-dimensional code and the second two-dimensional code based on the generated character information.

9. An image processing apparatus comprising:

an input unit configured to receive an instruction indicating one of a first mode and a second mode;

a scanner configured to generate an image data;

a storage unit;

a processor configured to extract character information from the image data, generate a first two-dimensional code representing the extracted character information if the received instruction indicates the first mode, and control the storage unit to store the extracted character information and generate a second two-dimensional code indicating a location of extracted character information stored in the storage unit if the received instruction indicates the second mode; and a display unit configured to display one of the first two-dimensional code and the second two-dimensional code.

10. The apparatus according to claim 9, wherein the processor is configured to extract the character information in tabular form from the image data.

11. The apparatus according to claim 10, wherein the processor is configured to extract the character information, a ruled line and a position of the ruled line formed from the image data, convert the extracted ruled line to a character emulating the extracted ruled line, generate a character information based on the extracted character information, the character converted from the extracted ruled line and the position of the ruled line, and generate one of the first two-dimensional code and the second two-dimensional code based on the generated character information.

\* \* \* \* \*